Jan. 9, 1951     E. R. SHENK ET AL     2,537,163
SIGNAL RECEIVING SYSTEM
Filed Jan. 24, 1946
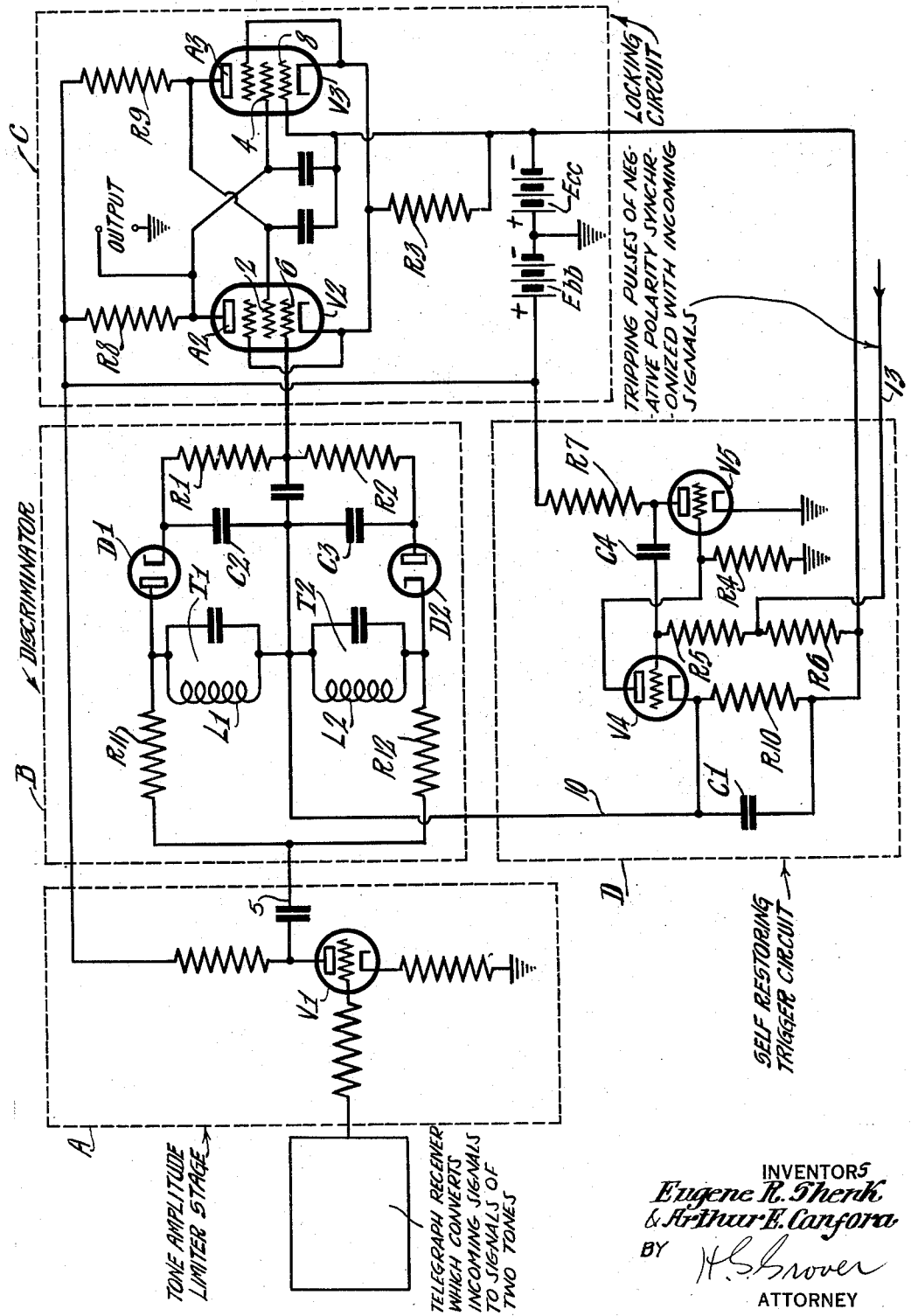
INVENTORS
*Eugene R. Shenk*
*& Arthur E. Canfora*
BY
ATTORNEY Patented Jan. 9, 1951

2,537,163

UNITED STATES PATENT OFFICE 2,537,163

SIGNAL RECEIVING SYSTEM

Eugene R. Shenk and Arthur E. Canfora, Brooklyn, N. Y., assignors to Radio Corporation of America, a corporation of Delaware Application January 24, 1946, Serial No. 643,094

10 Claims. (Cl. 178—88)

1

This invention relates to a method of and apparatus for "gating" or selectively controlling the time of response of a circuit at a signal receiving station.

It is known to use a "gate" (sometimes referred to as a shutter), in pulse receiving systems in order to render a circuit responsive substantially only at the time of expected arrival of the incoming signal and for a predetermined period of time. Such known circuits are normally made to be non-responsive during intervals when the signals are not expected to arrive, so as to prevent false signals, such as might be due to noise, ignition radiation, interference, etc., from reaching the translating part of the receiving system. So far as we are aware, this "gating" procedure has been used only in connection with pulse systems utilizing spaced pulses of constant average pulse rate and composed of alternating current waves of a single frequency.

The present invention broadly concerns the art of "gating," and has for one of its objects to provide a "gating" system for use with pulses of two different alternating currents.

Another object of the invention is to provide a gating circuit which operates to enable the passage of the mark and space signals of a telegraph system but which prevents the passage of signals during intervals between the expected arrival of the mark and space signals.

A further object is to provide a gating system for two tone signals.

A specific object is to enable a locking circuit having two degrees of electrical stability to respond to an incoming signal for a predetermined interval of time corresponding to the approximate arrival time of the signal.

A feature of the invention is the frequency discriminator circuit which eliminates the necessity of transformers and accepts a single-ended (two-terminal input with one terminal tied to a common ground) input voltage and provides an output voltage which varies from positive to negative with respect to ground with change of input frequency.

A more detailed description of the invention follows, in conjunction with a drawing whose single figure illustrates one embodiment of the present invention.

Referring to the drawing, there are shown within separate boxes A, B, C and D respectively, four distinct circuits which cooperatively combine to form the two tone signal gating system of the invention.

2

Circuit A comprises a vacuum tube V1 which represents the last stage of a chain of tone amplifiers or amplitude limiter tubes. The input to the grid of triode tube V1 comprises spaced tone signals which may constitute the output of a receiver. The input of the receiver may be telegraph signals representing marking and spacing pulses either of different lengths representative of a suitable telegraphic code, or else different frequencies. This receiver may then convert the incoming signals to signals of two tones representing the marking and spacing frequencies. By way of example, these tones may be 800 cycles and 1000 cycles. The output of amplitude limiter stage V1 feeds the frequency discriminator B over lead 5.

Frequency discriminator B comprises two tuned circuits T1 and T2 tuned to different frequencies and a pair of detectors D1 and D2. The different frequencies to which circuits T1 and T2 may be tuned may, for example, be the marking frequency and the spacing frequency supplied to the frequency discriminator from tube V1. If the marking and spacing frequencies supplied to the frequency discriminator are 800 cycles and 1000 cycles, respectively, then the tuned circuits T1 and T2 may be tuned to 800 cycles and 1000 cycles respectively. The input frequencies to the discriminator feed the tuned circuits via a pair of resistors R11 and R12 which are directly connected together at one end and connected to the tuned circuits at their other ends. Connected across tuned circuit T1 there is provided a diode vacuum tube rectifier D1 in series with a parallel combination of resistor R1 and condenser C2. Connected across tuned circuit T2 is a diode rectifier D2 in series with a parallel combination of resistor R2 and condenser C3. It should be noted that the anode of diode D1 is directly connected to one terminal of the tuned circuit T1, while the cathode of diode D2 is connected to a corresponding terminal of tuned circuit T2. For a given instantaneous input frequency supplied to discriminator B, there will appear different amplitudes of voltage across the tank circuits T1 and T2. One exception is a frequency approximately mid way between the resonant frequencies of the two tuned circuits at which the voltages will be of equal amplitude. The capacitors C2 and C3 are charged to their peak amplitude of voltage across the tank circuits T1 and T2 through the diode rectifiers D1 and D2, respectively. By virtue of the polarities of the diode connections, condenser C2 is charged positive with respect to its neutral or ground plane corresponding to the junction point of the two tuned circuits and condenser C3 is charged negative with reference to this same ground plane. At the junction point of resistors R1 and R2, a voltage is obtained whose magnitude and polarity depend upon the relative magnitudes of the charges on condensers C2 and C3. It is preferred that resistors R1 and R2 be equal, in which case if the magnitudes of the voltages on condensers C2 and C3 are equal, then the output voltage will be essentially zero. If the voltage on condenser C2 is greater than that on condenser C3, the output voltage will be of positive polarity. If the voltage on condenser C3 is greater than the voltage on condenser C2, then the output voltage will be of negative polarity.

The circuit D is a self-restoring trigger circuit having only one degree of electrical stability. It comprises a pair of vacuum tubes V4 and V5 whose anode and grid electrodes are interconnected regeneratively. In the stable state of the trigger circuit, the vacuum tube V4 is conductive while the vacuum tube V5 is non-conductive. In the active or unstable state of the trigger circuit, the current passing conditions of these two vacuum tubes are reversed. The time in which the trigger circuit remains in its active or unstable state in response to a tripping pulse is determined primarily by the time constant of the associated circuit elements. Condenser C1 is a by-pass condenser for the two tone signal frequencies which might appear in lead 10 in the output of the trigger circuit. A suitable local input pulse for tripping the trigger circuit from its stable to its active state is supplied over lead 13. The tripping pulse supplied to trigger circuit V4, V5 over lead 13 should be of negative polarity with the particular circuit connections shown, and this tripping pulse is synchronized with respect to the incoming signals so as to trip the trigger circuit at the approximate time of expected arrival of the incoming signals and for a predetermined length of time sufficient to enable the incoming signals to pass through the discriminator B to the locking circuit C. Output from the trigger circuit is taken from lead 10 which is connected to the junction point of the two tuned circuits T1 and T2 of the frequency discriminator B.

The locking circuit is similar to that described in my copending application Serial No. 580,525, filed March 2, 1945, now abandoned and comprises two evacuated electron discharge devices V2 and V3 of the pentode type whose electrode structures are so interconnected that when one device conducts it causes a negative bias to be applied to the grid of the other device and hence, causes the other device to be extinguished, and vice versa. Such a locking circuit has two degrees of electrical stability. The anodes A2 and A3 are connected by load resistances R8 and R9, respectively, to the positive terminal of a direct current anode potential source designated herein Ebb. The negative terminal of this source is grounded. The cathodes of these tubes are connected by a common cathode biasing resistor R3 to the negative terminal of another direct current source designated Ecc. The positive terminal of this source is grounded. This then puts the tube impedances each in series with its individual load resistor and the common cathode resistor in shunt to a direct current source of potential. The screening electrodes 2 and 4 are cross-coupled to the anodes A3 and A2, respectively, and these connections are substantially direct so that the potential at the anode of A2 appears on the screening electrode 4, while the anode potential developed at A3 appears on the screening electrode 2. The suppressor electrodes are directly connected to the cathodes of their tubes. The control grid 6 of tube V2 is connected to its cathode over a path including resistor R1 of the two tone discriminator circuit B, diode D1, inductance coil L1 of tuned circuit T1, lead 10, resistor R10 of the self-restoring trigger circuit D, and resistor R3. The control grid 6 of tube V2 is also connected to its cathode over a path including resistor R2, diode D2, inductance coil L2, lead 10, resistor R10, and resistor R3. The input to the locking circuit is a direct current potential which alternates above and below, i. e., plus or minus with respect to the cathode, and is applied to the grid electrode 6. The control grid electrode 8 is connected directly to the negative terminal of direct current source Ecc.

The operation of the locking circuit will now be explained. Assume that a voltage that is of positive polarity relative to the cathode is applied to the input terminals and appears on the grid 6. This positive voltage will cause tube V2 to conduct and develop a positive voltage across the resistor R3, thus increasing the negative bias in the grid circuit of tube V3 which has its control grid 8 connected to the negative end of Ecc. As a result, the anode current through tube V3 decreases and the voltage lost in load resistor R9 decreases so that the voltage at the anode A3 end of resistor R9 rises and this increase in voltage is applied to the screen grid 2 of tube V2 so that the potential thereon increases. Because of this higher screen grid voltage or potential the anode current through tube V2 increases still further, biasing the control grid 8 of tube V3 more negative because of the increased voltage drop in resistor R3 and also decreasing the screen grid 4 voltage of tube V3 because of the increased drop in potential in R8 due to the increased anode current in tube V2. As a result of the above regenerative or accumulative action, tube V2 becomes fully conductive and tube V3 becomes non-conductive or cut off. The output may be taken, for example, at the anode end of resistance R8, and supplied to the signal translating part of the receiving system.

It will be noted that the common bias voltage appearing across resistor R3 is applied to the control grids 6 and 8 of tubes V2 and V3. However, due to the fact that the voltage on the screen grid 4 of the tube V3 is much less than the voltage on the screen grid 2 of tube V2, due to the anode current of tube V1 flowing in resistance R8, tube V3 can be rendered non-conductive by this bias, although the tube V2 will still be conductive. Consequently the tube V2 will remain conducting and will lock or bias the tube V3 beyond cut off. This will be true even though the positive input voltage applied to grid 6 of tube V2 should fall to zero. This is one condition of electrical stability for the locking circuit.

The conductive conditions of tubes V2 and V3 may be interchanged by momentarily or permanently applying a negative voltage on control grid 6. This negative voltage will reduce the bias voltage across resistor R3 and permit tube V3 to pass current. When tube V3 passes current it will develop a biasing voltage across R3 which is applied to the control grids 6 and 8. The increased flow of current in V3 causes a potential drop at the anode A3 and thereby reduces the voltage on the screen grid 2 of tube V2 with the result that the tube V2 will be locked off and will remain non-conductive even if the negative input signal is removed and the grid 6 again approaches zero potential with respect to ground. This is the other condition of electrical stability for the locking circuit.

In the operation of the system of the invention, each of the tuned circuits T1 and T2 of the frequency discriminator will resonate to a given tone supplied thereto by circuit A, and the diode associated with the tuned circuit receiving a tone to which it is resonant will give one-half wave rectification for that tone. Depending upon the particular tuned circuit T1 or T2 which is resonated by the incoming tone signal (mark or space), a positive or negative voltage with respect to the negative terminal —Ecc (representing mark for one tone and space for the other) appears on the grid 6 of the locking circuit C.

Assuming the condition when no signals are expected to arrive, the self-restoring trigger circuit D will be in its stable state, in which tube V4 is conducting and tube V5 non-conducting. While tube V4 is conducting, current will flow through this tube and through a resistor R4 thus developing a negative potential with respect to ground equal to I4 R4, where I4 is the anode current of V4, and this negative potential is applied to the grid of tube V5, thus holding tube V5 in the non-conducting condition. Current will also flow through resistor R10 in the cathode circuit of tube V4, thus making available a potential in lead 10 equal to I4 R10 and this potential is positive with respect to —Ecc. It should be noted that the cathodes of the locking circuit V2 and V3 are returned to —Ecc through the common cathode resistor R3.

The positive voltage available in lead 10 and equal to I4 R10 is of sufficient magnitude to pass through coil L1 of tuned circuit T1 of the frequency discriminator B and cause diode rectifier D1 to pass current, thus producing through resistor R1 a positive voltage on the grid 6 of vacuum tube V2 of the locking circuit, thereby holding the locking circuit in that degree of electrical stability in which V2 is conducting and V3 non-conducting.

As mentioned previously in connection with the specific description of the locking circuit, the grid 6 of the tube V2 of the locking circuit is returned to its cathode over a path including resistor R1, diode D1, coil L1 of tuned circuit T1, lead 10, and resistor R10 of the self-restoring trigger circuit.

The system is so designed that the positive potential supplied over lead 10 to the grid 6 of the tube V2 of the locking circuit is greater in magnitude than the negative potential with respect to —Ecc, which is developed when the incoming signals resonate tuned circuit T2. In this condition, the locking circuit remains in the position wherein V2 is conducting and tube V3 non-conducting despite possible passage by circuit A to the frequency discriminator of spurious static pulses or noises. Such interference is not permitted to affect the locking circuit because of the fact that the locking circuit is held in position by the positive potential on lead 10. However, when it is desired to receive a signal, the synchronized local pulse oscillator will supply a pulse of negative polarity to lead 13 in order to trip the trigger circuit D from its stable to its active state. The tripping of the trigger circuit will cause tube V4 to cease conducting and tube V5 to conduct, in which condition the voltage drop across resistors R10 and R4 will be zero and no positive voltage will be available in lead 10. Hence the locking circuit will be responsive to any signal developed in the frequency discriminator B. For example, if a tone signal supplied to the frequency discriminator (such as a marking signal) resonates tuned circuit T1 and develops a positive voltage across resistor R1, the locking circuit will remain in the same position as before. However, if a spacing tone signal is supplied to the frequency discriminator B (which resonates tuned circuit T2 and causes a negative voltage to be developed across R2 and supplied to the grid 6 of the locking circuit), this last signal will change the degree of electrical stability of the locking circuit and cause V3 to conduct and V2 to cease conducting.

From the foregoing, it will be seen that in the interval in which no signals are expected to arrive, the self-restoring trigger circuit D supplies a flooding potential of positive polarity to the locking circuit C to maintain this locking circuit in a certain condition of electrical stability, thus preventing the operation of the locking circuit due to noise or interference signals.

When desired incoming signals are expected to arrive, the local pulse oscillator causes the trigger circuit D to trip and to remove the flooding positive potential from the locking circuit, thus enabling the desired incoming signals to assume full control over the locking circuit for a desired time interval, depending primarily upon the time constants of the self-restoring trigger circuit.

The invention is not limited to a method of and apparatus for controlling the locking circuit, since, if desired, the locking circuit can be replaced by an ordinary amplifier or vacuum tube, in which case this tube would be located in the output of the frequency discriminator and take the place of tube V2.

The term "discriminator" used in the appended claims is deemed to include the rectifiers or detectors employed for producing a unidirectional or D. C. voltage output.

What is claimed is:

1. In a signal receiving system, an amplifier tube receiving two tone signals, a frequency discriminator circuit having a pair of parallel tuned circuits and coupled to the output of said amplifier tube and producing signals of relatively opposite polarities in response to said two tone signals, said discriminator circuit also including a pair of diode rectifiers one of which is connected across one of said tuned circuits and the other rectifier of which is connected across the other tuned circuit but oppositely poled relative to said first rectifier, a locking circuit having two degrees of electrical stability coupled to the output of said discriminator circuit, and means synchronized with the incoming signals for maintaining said locking circuit in one particular degree of electrical stability during intervals between incoming signals, said means including a circuit for supplying a positive voltage to said tuned circuits only during the time signals are not being received, thereby relinquishing control over said locking circuit at times when signals are expected to arrive.

2. In a signal receiving system adapted to receive marking and spacing signals, means to convert said signals to two tone signals, a frequency discriminator having a pair of differently tuned circuits resonant to said two tones and producing unidirectional currents of relatively opposite polarities in response to the signals of different tones, an electron discharge device circuit coupled to the output of said frequency discriminator, a self-restoring trigger circuit having a stable state and an active state, a connection from said trigger circuit to said discharge device circuit, said trigger circuit in the stable state developing a voltage in said connection which prevents said discharge device circuit from operating in the presence of tone signals in said frequency discriminator, and means for supplying waves to said trigger circuit for tripping said trigger circuit to the active state to thereby alter the value of said voltage in said connection and enable said discharge device to respond to incoming signals.

3. In a signal receiving system adapted to receive marking and spacing signals, means to convert said signals to two tone signals, a frequency discriminator having a pair of differently tuned circuits resonant to said two tones and producing unidirectional currents of relatively opposite polarities in response to signals of different tones, an electron discharge device circuit coupled to the output of said frequency discriminator, a self-restoring trigger circuit having a stable state and an active state, a connection from said trigger circuit to said discharge device circuit, said trigger circuit in the stable state developing a voltage in said connection which prevents said discharge device circuit from operating in the presence of tone signals in said frequency discriminator, and a source of pulses of predetermined polarity coupled to said trigger circuit for tripping the same to the active state to thereby remove said voltage from said connection and enable said discharge device to respond to said unidirectional currents, said source being synchronized with the incoming signals.

4. In a signal receiving system, an amplifier tube receiving two tone signals, a frequency discriminator circuit coupled to the output of said amplifier tube and producing signals of relatively opposite polarities in response to said two tone signals, a locking circuit having two degrees of electrical stability coupled to the output of said discriminator circuit, and a trigger circuit operating in synchronism with the incoming pulses for maintaining said locking circuit in one particular condition of electrical stability during substantially the entire time interval between incoming signals.

5. In a system in which intelligence is transmitted by marking and spacing signals, a receiver for receiving said signals and for converting them to marking and spacing frequencies of different but lower frequencies than the received signals, a frequency discriminator circuit coupled to the output of said receiver for producing potentials of one sign in response to marking signals and potentials of opposite sign in response to spacing signals, an electron discharge device coupled to the output of said frequency discriminator and responsive to said potentials, and means operating in synchronism with said signals and coupled to said device for supplying to said device during time intervals between incoming signals a bias voltage of sufficient magnitude to prevent operation of said device.

6. In a system in which intelligence is transmitted by marking and spacing signals, a receiver for receiving said signals and for converting them to marking and spacing frequencies of different but lower frequencies than the received signals, a frequency discriminator circuit coupled to the output of said receiver for producing potentials of one sign in response to marking signals and potentials of opposite sign in response to spacing signals, an electron discharge device coupled to the output of said frequency discriminator and responsive to said potentials, and a self-restoring trigger circuit operating in synchronism with said signals and coupled to said device for supplying to said device during time intervals between incoming signals a bias voltage of sufficient magnitude to prevent operation of said device, said trigger circuit having in circuit therewith a source of locally generated pulses for controlling its operation.

7. A system for preventing noise and interference pulses from entering the translating part of a signal receiving station, comprising a locking circuit having its output coupled to said translating part and its input coupled to the signal collecting part of said station, said locking circuit having two degrees of electrical stability and being characterized by its ability to remain locked in either degree of electrical stability until changed into the other degree by the positive application of a pulse of predetermined polarity and magnitude, a self-restoring trigger circuit having a stable state and an active state, a connection from said trigger circuit to said locking circuit, said trigger circuit in the stable state developing a voltage of such polarity in said connection which prevents said locking circuit from operating in the presence of incoming signals fed to said locking circuit, and a source of locally produced pulses operating in synchronism with the desired incoming signals for tripping said trigger circuit from the stable to the active state to thereby alter the value of said voltage in said connection and enable said locking circuit to respond to the desired incoming signals.

8. A system for preventing noise and interference pulses from entering the translating part of a signal receiving station, comprising a locking circuit having its output coupled to said translating part and its input coupled to the signal collecting part of said station, said locking circuit having two degrees of electrical stability and being characterized by its ability to remain locked in either degree of electrical stability until changed into the other degree by the positive application of a pulse of predetermined polarity and magnitude, a trigger circuit comprising a pair of vacuum tube electrode structures regeneratively connected to produce an output voltage, a connection from said structures to said locking circuit for supplying a steady controlling voltage to said locking circuit, said output voltage produced by said trigger circuit having such sense and magnitude as to prevent said locking circuit from operating in the presence of incoming signals fed to said locking circuit, and a source of local waves coupled to said pair of electrode structures for causing the same to produce said output voltage at intervals and in synchronism with the desired incoming signals.

9. In a system in which intelligence is transmitted by marking and spacing signals, a receiver for receiving said signals and for converting them to marking and spacing frequencies of different but lower frequencies than the received signals, a frequency discriminator circuit coupled to the output of said receiver for producing potentials of one sign in response to marking signals and potentials of opposite sign in response to spacing signals, said discriminator circuit including first and second parallel tuned circuits, a direct connection between a terminal of said first tuned circuit and a terminal of the second tuned circuit, said tuned circuits resonating at different frequencies, a diode having its anode directly connected to the other terminal of said first tuned circuit and its cathode coupled through a parallel arrangement of a condenser and a resistor to the junction of said tuned circuits, another diode having its cathode directly connected to the other terminal of said second tuned circuit and its anode coupled through a parallel arrangement of a condenser and a resistor to the junction of said tuned circuits, an electron discharge device coupled to the junction of said tuned circuits, a self-restoring trigger circuit having a pair of vacuum tubes interconnected regeneratively, one of said tubes being normally conductive and the other tube normally non-conductive in the stable state of said trigger circuit and vice versa in the active state of said trigger circuit, a direct connection from the cathode of said normally conductive tube to the junction of said tuned circuits, whereby said trigger circuit supplies a bias voltage to said electron discharge device of sufficient magnitude to prevent a change in condition thereof during time intervals between incoming signals, and a source of locally generated pulses for controlling the operation of said trigger circuit to thereby remove said bias voltage and enable said electron discharge device to respond to incoming signals.

10. In a system for translating signals having different frequencies, a frequency discriminator supplied by said signals of different frequencies and producing potentials of one sign in response to signals of one frequency and potentials of opposite sign in response to signals of another frequency, an electron discharge device coupled to the output of said frequency discriminator and responsive to said potentials, and means operating in synchronism with said signals and coupled to said device for supplying to said device during time intervals between incoming signals a bias voltage of sufficient magnitude to prevent operation of said device.

EUGENE R. SHENK.
ARTHUR E. CANFORA.

REFERENCES CITED

The following references are of record in the file of this patent:

UNITED STATES PATENTS

| Number | Name | Date |
| --- | --- | --- |
| 1,844,950 | Finch | Feb. 16, 1932 |
| 2,185,199 | Kahn | Jan. 2, 1940 |
| 2,272,070 | Reeves | Feb. 3, 1942 |
| 2,361,437 | Trevor | Oct. 31, 1944 |